United States Patent [19]
Lee

[11] Patent Number: 6,012,550
[45] Date of Patent: Jan. 11, 2000

[54] BYPASS DEVICE FOR AUTOMATIC TRANSMISSION FLUID PROVIDED WITH A THERMAL EXPANSION BAR

[75] Inventor: Heon Lee, Seoul, Rep. of Korea

[73] Assignee: Hyundai Motor Company, Seoul, Rep. of Korea

[21] Appl. No.: 08/994,265

[22] Filed: Dec. 19, 1997

[51] Int. Cl.[7] .................................................. F01M 5/00
[52] U.S. Cl. ........................................... 184/6.22; 165/300
[58] Field of Search ........................ 74/606 A; 475/161; 184/6.22; 236/101 R, 93 R; 165/300

[56] References Cited

U.S. PATENT DOCUMENTS

| | | | |
|---|---|---|---|
| 3,554,440 | 1/1971 | Austin et al. | 236/34.5 |
| 4,027,643 | 6/1977 | Feenan et al. | 123/196 AB |
| 4,190,198 | 2/1980 | Casuga et al. | 236/34.5 |
| 4,512,300 | 4/1985 | DeVore et al. | 123/196 AB |
| 5,217,085 | 6/1993 | Barrie et al. | 184/104.1 |
| 5,244,036 | 9/1993 | Michl | 165/300 |
| 5,271,559 | 12/1993 | Naujock | 237/12.3 B |
| 5,568,842 | 10/1996 | Otani | 184/6.22 |
| 5,791,557 | 8/1998 | Kunze | 236/34.5 |

*Primary Examiner*—Thomas R. Hannon
*Assistant Examiner*—David Fenstermacher
*Attorney, Agent, or Firm*—Christie, Parker & Hale, LLP

[57] ABSTRACT

A bypass device for ATF (automatic transmission fluid) is disclosed. The bypass device of this invention has a valve housing with a plurality of ports. A spring-biased valve spool is movably received in the housing, while the thermal expansion bar is inserted into one end of the spool at a position opposite to a valve spring. The expansion bar selectively and thermally expands in accordance with the ATF temperature, thus moving the spool with two internal passages and one bypass passage being selectively formed in the valve housing. The device allows ATF to selectively bypass an ATF cooler in the event the ATF temperature is substantially low enough to allow the ATF to be free from any requirement of cooling, thus allowing the ATF at an appropriate temperature to circulate in the automatic transmission.

6 Claims, 4 Drawing Sheets

BYPASS DEVICE FOR AUTOMATIC TRANSMISSION FLUID PROVIDED WITH A THERMAL EXPANSION BAR

BACKGROUND OF THE INVENTION

1. Field of the Invention

The present invention relates, in general, to automatic transmissions for automobiles and, more particularly, to an ATF bypass device for such transmissions capable of allowing ATF (automatic transmission fluid) to selectively bypass an ATF cooler when the ATF temperature is substantially low enough to allow the ATF to be free from any requirement of cooling, thus allowing the ATF at an appropriate temperature to selectively and quickly circulate in an automatic transmission.

2. Description of the Prior Art

As is well known to those skilled in the art, ATF (automatic transmission fluid), which is used as actuating oil in automatic transmissions for automobiles, varies in its viscosity in accordance with its temperature. Such a variation in the ATF's viscosity may have a negative effect on the operational performance of automatic transmissions.

Particularly, when the temperature of the ATF at the time of starting an engine is not fixed due to variable climatic temperatures it may vary in its viscosity. Therefore, it is impossible to expect uniform operational performance of an automatic transmission or to expect uniform output power of an engine when the engine is started.

Meanwhile, when the engine runs at a high rpm (revolutions per minute) or runs for a lengthy period of time, the temperature of the ATF rises resulting in the viscosity of the ATF being reduced, thus causing the power transmission efficiency of the automatic transmission to be reduced. In order to overcome the above problem caused by the high temperature ATF, the ATF temperature may be reduced by an oil cooler (ATF cooler) when the ATF temperature rises excessively.

FIG. 1 shows an automatic transmission with a typical ATF cooling device. In the operation of the automatic transmission 10, ATF is repeatedly discharged from the transmission 10 into an ATF cooler 20 through an outlet port 11 during the circulation of the ATF in the transmission 10. The ATF cooler 20 cools the ATF, thus reducing the ATF temperature prior to returning the ATF into an oil tank 15 of the transmission 10 through a return port 12.

However, the above ATF cooling device is problematic in that the ATF has to repeatedly pass through the cooler 20 regardless of the ATF temperature. The cooling device thus prevents the ATF temperature from quickly warming and rising to an appropriate point when starting the engine in low temperatures. In such a case, the ATF has an undesirably poor fluidity for a time, thus generating a shifting shock and reducing the operational performance of the engine, with the engine being started in low temperatures.

SUMMARY OF THE INVENTION

Accordingly, the present invention has been made keeping in mind the above problems occurring in the prior art. An object of the present invention is to provide a bypass device for ATF (automatic transmission fluid), which allows ATF to selectively bypass an ATF cooler when the ATF temperature is substantially low enough to allow the ATF to be free from any requirement of cooling, thus allowing the ATF at an appropriate temperature to selectively and quickly circulate in an automatic transmission.

In order to accomplish the above object, the present invention provides a bypass device for ATF, comprising: a valve housing having a first port adapted for receiving ATF (automatic transmission fluid) from an automatic transmission; a second port adapted for discharging the ATF from the valve housing into an ATF cooler; a third port adapted for receiving the ATF from the ATF cooler; a fourth port adapted for discharging the ATF from the valve housing into an oil tank of the transmission; a valve spool movably received in the valve housing so as to be axially movable in the valve housing in accordance with the ATF temperature while selectively forming two internal passages or one bypass passage in the valve housing, the two internal passages being simultaneously formed in the valve housing and including a first internal passage allowing the first and second ports to communicate together and a second internal passage allowing the third and fourth ports to communicate together, and the bypass passage allowing the first and fourth ports to communicate together; a thermal expansion bar axially inserted into one end of the valve spool and having a high thermal expansion coefficient, thus selectively and thermally expanding in accordance with the ATF temperature and allowing the valve spool to selectively form the two internal passages or the bypass passage; and a spring provided in the valve housing at a position opposite the thermal expansion bar and adapted for normally biasing the valve spool.

DESCRIPTION OF THE DRAWINGS

The above and other objects, features and other advantages of the present invention will be more clearly understood from the following detailed description taken in conjunction with the accompanying drawings, in which:

FIGS. 2A and 2B are sectional views of a bypass device showing the construction and operation of a bypass device for automatic transmission fluid in accordance with the primary embodiment of the present invention, in which:

FIG. 2A shows the bypass device in a bypassing mode, where ATF circulates while bypassing an ATF cooler; and FIG. 2B shows the bypass device in a cooling mode, where the ATF passes through the ATF cooler.

DETAILED DESCRIPTION OF THE INVENTION

Figure 1:
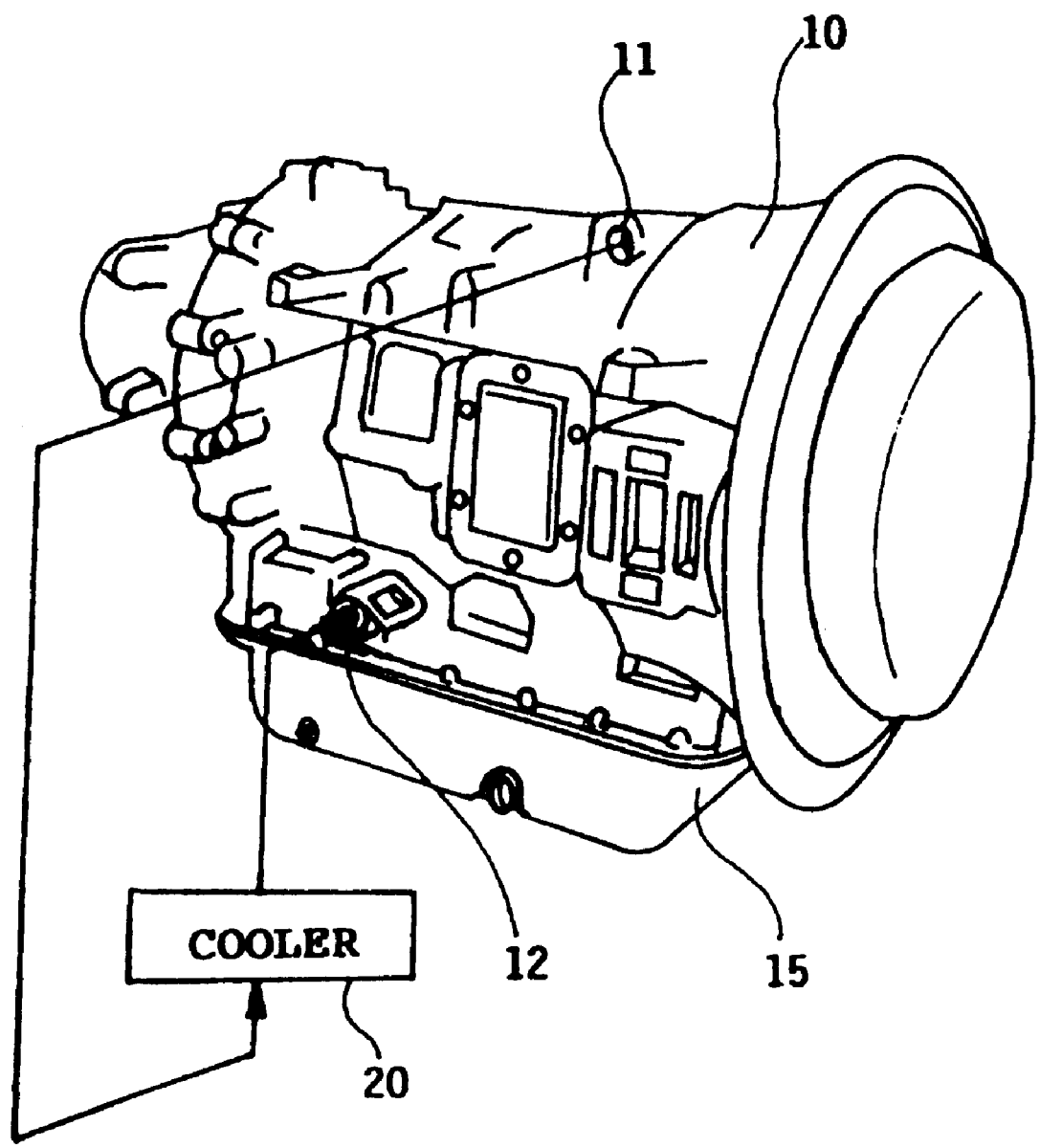
FIG. 1 shows an automatic transmission with a typical ATF cooling device.
Figure 2A:
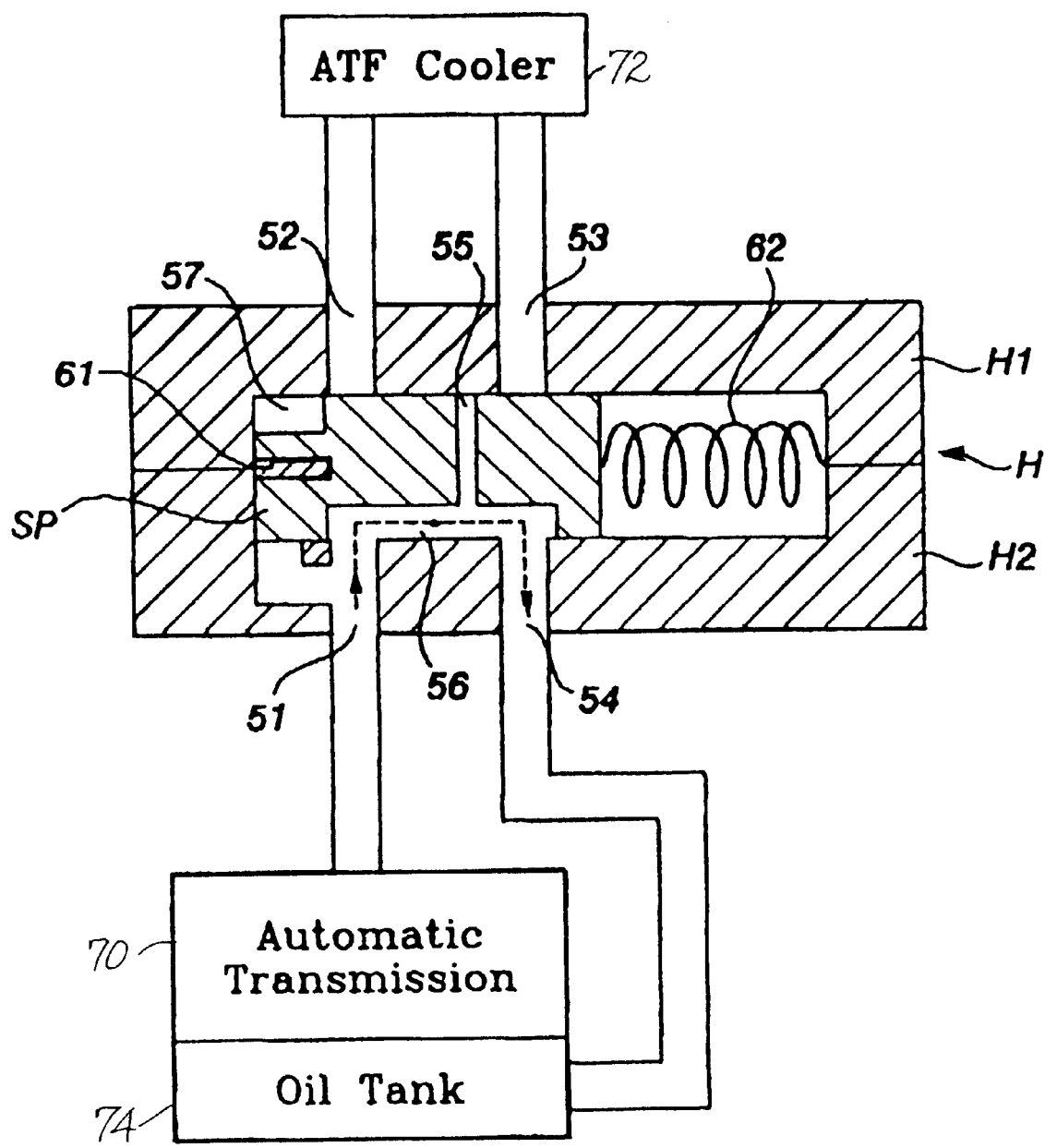
Figure 2B:
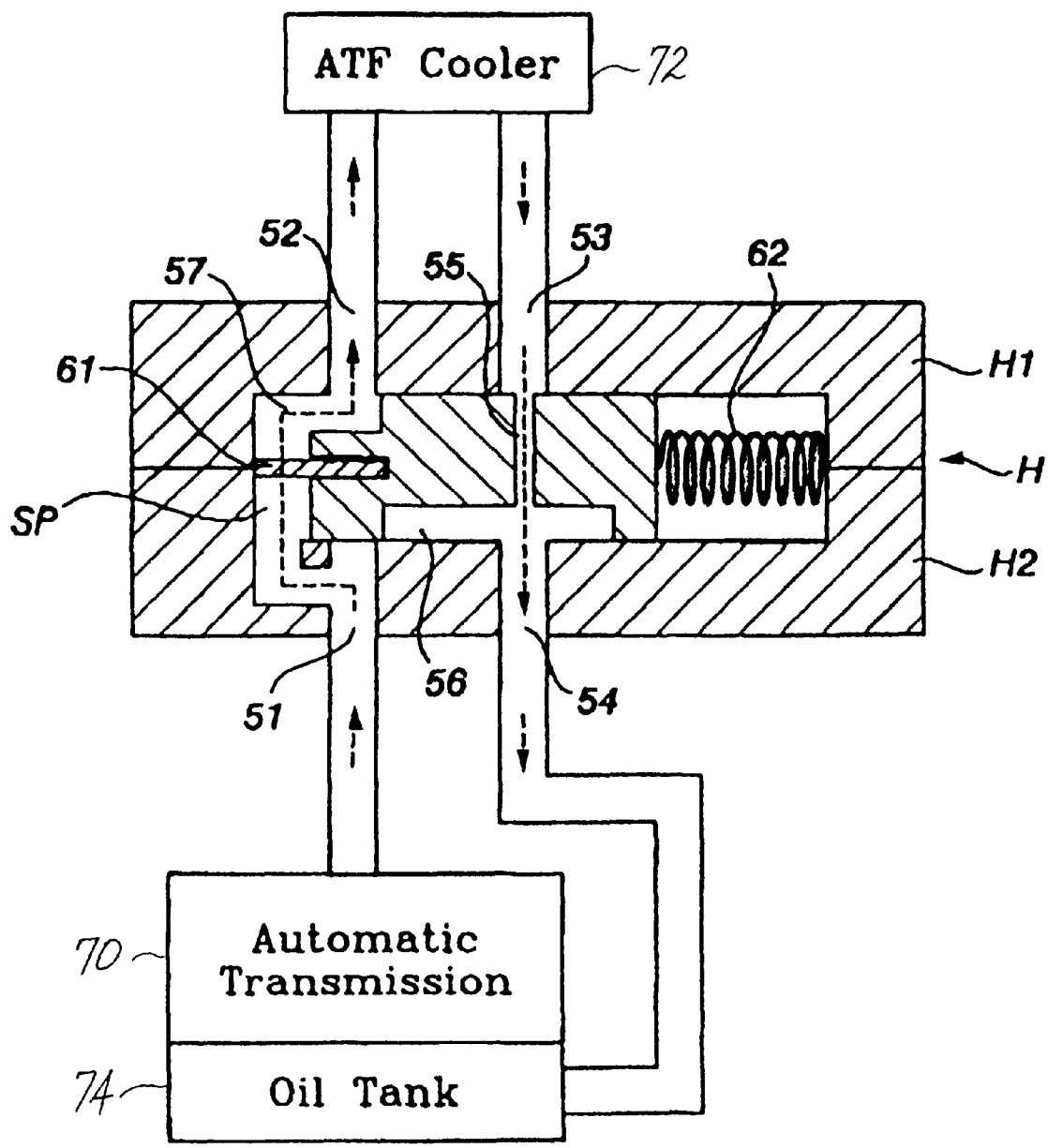

FIG. 2A shows an ATF bypass device according to the primary embodiment of this invention in a bypassing mode, wherein ATF circulates while bypassing an ATF cooler. FIG. 2B shows the bypass device in a cooling mode, wherein the ATF passes through the ATF cooler. For ease of description, the end of the bypass device on the left-hand side of the drawings will be referred to as the left end of the device and the opposite end on the right-hand side of the drawings will be referred to as the right end.

Figure 2C:
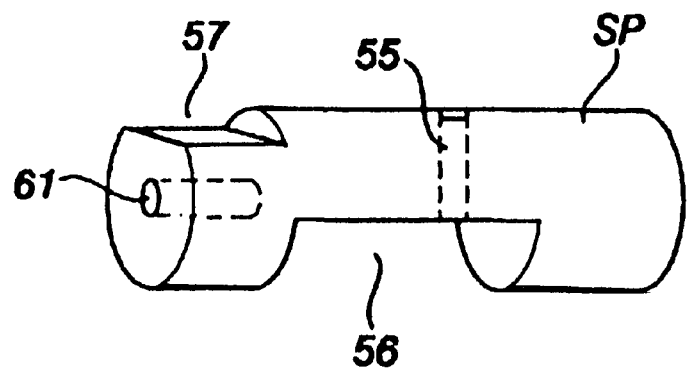
FIG. 2C shows a perspective view of a valve spool of the present invention.

As shown in FIGS. 2A and 2B, the ATF bypass device of this invention, which is installed on an oil passage extending between an automatic transmission and an ATF cooler, is comprised of a valve housing H. A spring-biased valve spool SP is movably received in the valve housing H, thus being axially movable to the left or right in the housing H. A perspective view of the spool is shown in FIG. 2C. Axially inserted into the left end of the valve spool SP is a thermal expansion bar 61, with both ends of the bar 61 being stopped by the spool SP and the left interior end wall of the housing H. Meanwhile, the right end of the valve spool SP is normally biased to the left by a valve spring (a compression coil spring 62, with both ends of the spring 62 being stopped by the valve spool SP and the right interior end wall of the housing H. The thermal expansion bar 61 is movably inserted into the valve spool SP and has a high thermal expansion coefficient, thus selectively and thermally expanding in accordance with the ATF temperature and biasing the valve spool SP to the right while overcoming the spring force of the valve spring 62.

The valve housing H has first to fifth oil ports 51 to 54. The first port 51 receives the ATF from the automatic transmission 70, while the second port 52 feeds the ATF from the bypass device into the ATF cooler 72. The third port 53 receives the ATF from the cooler, while the fourth port 54 feeds the ATF from the bypass device into an oil tank 74 of the transmission.

The valve spool SP selectively moves to the left or right in accordance with the inlet ATF temperature, thus selectively forming an internal passage 55 and one bypass passage 57, or forming one bypass passage 56 in the housing H. The internal passage 55 and the bypass passage 57 are simultaneously opened when the bar 61 thermally expands and biases the spool SP to the right. Of the two internal passages, the bypass passage 57 allows the first and second ports 51 and 52 to communicate together, while the internal passage 55 allows the third and fourth ports 53 and 54 to communicate together. Meanwhile, the bypass passage 56 is selectively opened when the bar 61 maintains its original length, thus allowing the first and fourth ports 51 and 54 to communicate together.

The valve housing H is comprised of two housing parts: an upper part H1 and a lower part H2, which are easily assembled into a single body with both the valve spool SP and the spring 62 being interposed between the two parts H1 and H2. The upper housing part H1 has the second and third ports 52 and 53, while the lower housing part H2 has the first and fourth ports 51 and 54.

The operational effect of the above ATF bypass device will be described hereinbelow in conjunction with the drawings.

When an engine is started in low temperatures or when the transmission performs a shifting operation with a low ATF temperature, the thermal expansion bar 61 of the valve spool SP does not expand as shown in FIG. 2A. The valve spool SP is thus fully biased to the left by the spring 62, with the left end wall of the spool SP being brought into close contact with the left interior end wall of the housing H.

The valve spool SP in the above state opens the bypass passage 56, thus allowing the first and fourth ports 51 and 54 to communicate together. Therefore, the ATF, which is received from the transmission 70 through the first port 51, passes through the bypass passage 56 prior to being discharged into the oil tank 74 of the transmission through the fourth port 54.

That is, when the ATF temperature is not higher than a specific point, the bypass device allows the low temperature ATF to bypass the ATF cooler and allows the ATF temperature to quickly rise to an appropriate point.

Meanwhile, when the ATF temperature rises to a point higher than an appropriate point, the expansion bar 61 thermally expands due to the high temperature ATF as shown in FIG. 2B. In this case, the thermal expansion coefficient of the expansion bar 61 is substantially high enough to allow the bar 61 to sensitively expand in accordance with the ATF temperature. When the expansion bar 61 thermally expands as described above, the bar 61 biases the spool SP to the right while compressing the spring 62.

When the valve spool SP moves to the right due to the thermal expansion of the bar 61, the bypass passage 56 closes, thus stopping the communication between the first and fourth ports 51 and 54. Meanwhile, the valve spool SP in the above state allows the first port 51 to communicate with the second port 52 through the bypass passage 57 and allows the second port 52 to communicate with the fourth port 54 through the internal passage 55.

Therefore, the high temperature ATF, which is received from the transmission 70 into the valve housing H through the first port 51, is discharged into the ATF cooler 72 through the second port 52, thus being cooled by the cooler. On the other hand, the cooled ATF from the cooler passes through the third port 53 and the internal passage 55 respectively, prior to being discharged into the oil tank 74 of the transmission through the fourth port 54.

That is, when the ATF temperature is higher than an appropriate point, the bypass device allows the ATF to pass through the ATF cooler prior to being returned to the oil tank of the transmission. Therefore, the bypass device effectively prevents the ATF temperature from rising excessively.

Figure 3:
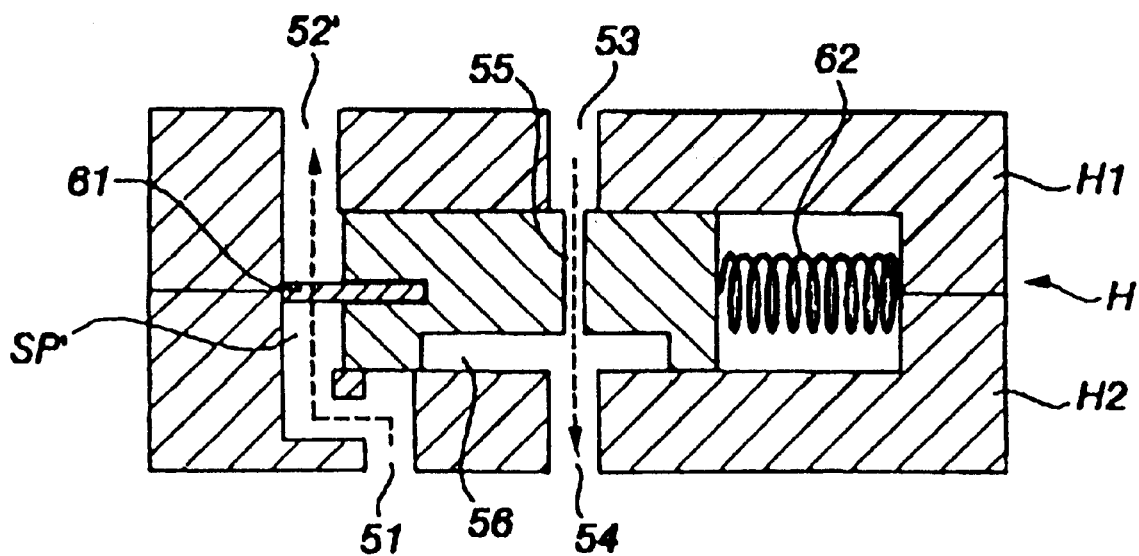
FIG. 3 is a sectional view showing the construction and operation of a bypass device in accordance with another embodiment of the present invention.

FIG. 3 shows the construction and operation of an ATF bypass device in accordance with a second embodiment of the present invention. In the bypass device according to the second embodiment, the general shaft of the bypass device remains the same as in the primary embodiment, but the second port 52' is formed at a position leaning to the left end of the valve housing H as compared to the second port 52 of the primary embodiment, and valve spool SP' does not have a bypass internal passage 57 different from the primary embodiment. When the thermal expansion bar 61 is thermally expanded during the operation of the above bypass device, ATF passes through the first port 51, the passage defined between the valve housing H and the left end of the valve spool SP', and the second port 52' prior to being fed into the oil cooler.

As described above, the present invention provides a bypass device for ATF (automatic transmission fluid). The bypass device of this invention allows ATF to selectively bypass an ATF cooler when the ATF temperature is substantially low enough to allow the ATF to be free rom any requirement of cooling, thus allowing the ATF within an appropriate temperature to circulate in an automatic transmission. The bypass device thus improves ATF's fluidity, allows an engine to be effectively started in low temperatures, and allows a shifting operation to be effectively performed without generating a shifting shock at such a low temperature.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In an automatic transmission which has an automatic transmission fluid (ATF) cooler and an oil tank, a bypass device for automatic transmission fluid comprising:

a valve housing comprising,
a first port adapted for receiving ATF (automatic transmission fluid) for said automatic transmission, a second port adapted for discharging the ATF from the valve housing into said ATF cooler, a third port adapted for receiving the ATF from the ATF cooler, and a fourth port adapted for discharging the ATF from the valve housing into said oil tank of the transmission;

a valve spool movably received in said valve housing, the valve spool comprising an internal passage and a bypass passage, the valve spool adapted for selectively allowing the first and second ports to communicate together and simultaneously allowing the third and fourth ports to communicate together via the internal passage or allowing the first and fourth ports to communicate together via the bypass passage;

a thermal expansion bar provided at one end of said valve spool and adapted for axially moving the valve spool in either direction in accordance with the ATF temperature; and a spring provided in the valve housing at a position opposite to said thermal expansion bar and adapted for biasing the valve spool.

2. The bypass device according to claim 1 wherein said valve spool is also provided with another bypass passage for allowing said first and second ports to communicate together.

3. In an automatic transmission which has an automatic transmission fluid (ATF) cooler and an oil tank, a bypass device for automatic transmission fluid comprising:

a valve housing comprising, a first port adapted for receiving ATF for said automatic transmission, a second port adapted for discharging the ATF from the valve housing into said ATF cooler, a third port adapted for receiving the ATF from the ATF cooler, and a fourth port adapted for discharging the ATF from the valve housing into said oil tank of the transmission;

a valve spool movably received in said valve housing, the valve spool comprising a first passage and a second passage, wherein the valve spool is movable to a first position allowing the third and fourth ports to communicate together via the first passage and allowing the first and second ports to communicate together, and wherein the valve spool is movable to a second position allowing the first and fourth ports to communicate together via the second passage;

a thermal expansion bar provided at one end of said valve spool and adapted for axially moving the valve spool in either direction response to the ATF temperature; and a spring provided in the valve housing at a position opposite to said thermal expansion bar for biasing the valve spool.

4. The bypass device according to claim 3, wherein the first passage is formed through the valve spool.

5. The bypass device according to claim 3, wherein the second passage is formed entirely on the outer surface of the valve spool.

6. The bypass device according to claim 3, wherein when at the second position the valve spool prevents the first and second ports from communicating and prevents the third and fourth ports from communicating.

* * * * *